3,582,266
PROCESS FOR PRODUCING BARIUM FERRITE
Samuel W. Sopp and Leo F. Heneghan, San Mateo, Calif., and Jack R. Anderson, Whippany, N.J., assignors to Merck & Co., Inc., Rahway, N.J.
No Drawing. Filed Sept. 24, 1968, Ser. No. 762,154
Int. Cl. C01f *11/00;* C01g *49/00*
U.S. Cl. 23—51                                                6 Claims

ABSTRACT OF THE DISCLOSURE

Barium ferrite is prepared by reacting a ferrous sulfate solution with a carbonate precipitating agent to produce a ferrous hydroxycarbonate slurry which is filtered. Barium carbonate is added to form a barium-iron carbonate co-slurry which is dried and conveted to the ferrite by calcination. In another embodiment, barium chloride is added to the ferrous hydroxycarbonate and a carbonate added to precipitate barium carbonate on the hydroxycarbonate particles. The addition of a carbonate to a solution of barium chloride and ferric chloride to precipitate an iron-barium hydroxycarbonate co-precipitate is also disclosed. Calcination of the co-precipitate yields barium ferrite.

---

This invention relates to a method of making permanent magnets and is directed particularly to magnetically anisotropic permanent magnets of ferritic composition. A ferrite is a crystalline material which is a compound of the reaction product of a metal oxide and iron oxide having the empirical formula $MFe_2O_4$ wherein M represents a bivalent metal. It has previously been proposed to use barium ferrite of hexagonal crystalline structure of the general formula $BaFe_{12}O_{19}$ in the manufacture of permanent magnets. Barium ferrite powder is conventionally utilized as the magnetic component in a variety of applications. Magnets produced employing this material have been found to have extraordinary high coercive force. The barium ferrite powders are employed in the production of flexible magnets wherein the ferrrite powder is incorporated into flexible non-magnetic elastomeric matrices by procedures well known in the art followed by exposing the formed piece to a magnetic field. Conventional means for practicing these techniques are discussed, for example, in United States Patents 2,959,832; 3,119,158; and 3,359,152. The flexible magnets may be used for a variety of applications including magnetic sealing gaskets, switches and toys, etc. In addition, the barium ferrite powders have been wet-mixed with a binder, pressed into the desired shape in a magnetic field and fixed at the appropriate temperature to form barium ferrite ceramic permanent magnets.

The commonly practiced method for the production of barium ferrite magnets is to first mill particles of barium carbonate and ferric iron oxide together to a fine state of subdivision. Extensive wet ball milling is required to achieve as intimate a mixture as possible. Thereafter a homogeneous mixture of the milled particles in the stoichiometric amount required for $BaO \cdot 6Fe_2O_3$ is prepared, and finally the mixture is calcined to transform the barium carbonate to barium oxide with concomitant in-situ formation of barium ferrite. The calcined sintered product is then ball milled to a fine state of subdivision to obtain $BaO \cdot 6Fe_2O_3$ in powdered form of desired particle size. However, ball-milling of the raw materials in accordance with the prior art techniques does not achieve an intimacy in the precalcined mixture which is conducive to rapid and complete reaction to barium ferrite. Moreover, it is well known that magnetic properties of the hexagonal barium ferrite are dependent upon compositional purity, crystallinity and particle size. Since the magnetic domain size of barium ferrite is of the order of 0.5–1.0 micron, particles larger than this would have multi-domain structure, resulting in the production of permanent magnets of considerably lessened magnetic strength. The extensive ball-milling of the sintered clinkers required by the prior art process does not always result in the production of barium ferrite powder within the particle size range indicated above.

The present invention departs significantly from the accepted procedures and practices heretofore employed in the production of powdered ferrites such as barium ferrite. In accordance with the process of the present invention barium ferrite particles of single domain size are consistently obtained without resorting to the inefficient and expensive comminution employed by the prior art. By utilizing chemical precipitation processes of the present invention it is possible to achieve a high degree of homogeneity of the pre-calcined material. This intimacy between the barium and iron cations prior to the solid state reaction allows for the lowering of calcining temperatures and/or times. Also, by controlling the reaction temperature, the critical particle size of the resulting barium ferrite can be maintained wtihin the 0.5–1.0 micron range in indicated above. As indicated previously, this has the effect of eliminating the necessity of ball-milling the fired materials to desired particle size. According to the precipitation processes of the present invention, the barium and iron cations are inherently in closer proximity after precipitation than is possible to achieve by the mere mechanical mixing of barium carbonate and ferric oxide powders. Moreover, the closer proximity of the metal cations not only permits for employing milder conditions during the reaction to barium ferrite but, in addition, the intimacy and homogeneity of the barium ferrite prepared according to the precipitation techniques of the invention prevents formation of undesirable by-products such as barium ferrate and $\alpha\text{-}Fe_2O_3$. Furthermore, commercial procedures commonly used in the preparation of barium ferrite powders are highly dependent upon the purity of the raw materials in order to obtain in satisfactory product. According to the present invention a highly purified barium ferrite product is achieved employing raw materials that could not otherwise be utilized in the commerical processes. In addition, a dried product is achieved which can be selectively calcined to varying, but controlled, particle sizes without employing harsh comminution techniques. This, along with milder reaction conditions, serves to significantly reduce costs in the manufacturing operation leading to the production of ferrite powders of magnetic strength as high and in most instances higher than the commercially available materials. It should be noted that although the invention shall be described with reference to barium ferrite, the inventive processes are applicable for the preparation of other magnetic ferrites such as strontium and lead.

In accordance with the method of the present invention, ferrous sulfate solution of from about 5% to about 15% concentration is reacted with a carbonate precipitating agent such as ammonium or an alkali metal carbonate such as sodium carbonate of from about 5% to about 15% concentration to produce a ferrous hydroxycarbonate slurry which is filtered and washed with water. Barium carbonate of from about 10% to about 50% concentration is added to form a barium-iron carbonate co-slurry which is then aged prior to drying. Although any of the conventional drying techniques well known in the art may be employed, spray drying at a temperature range from about 100–150° C. and the procedure of stick drying were found to be the preferred methods. The age of the slurry prior to drying may influence the grain growth during subsequent calcination to barium ferrite.

Aging of the co-slurry for about 1–5 days with continuous agitation is preferred. The dried product is then converted to barium ferrite by calcination. The selection of the temperature of the calcination procedure is determined by the particle size desired in the final barium ferrite product. It has been determined that temperatures within the range 900–1200° C. result in the preparation of a highly satisfactory barium ferrite material. In the practice of the process identified above, efficient filtration and sulfate removal may be achieved by employing an excess of sodium carbonate. A 10–20% excess of 10% sodium carbonate solution resulted in efficient filtration performance. It has also been observed that the period of time between precipitation of the ferrous hydroxycarbonate material and the filtration of this material may have an effect on the efficiency of the filtration and subsequent washing operation. The filtration and washing operation becomes less efficient when the period in question exceeds 2½ hours.

In another embodiment of the present invention, the ferrous hydroxycarbonate slurry is prepared in the manner described above. However, in the place of barium carbonate, a solution containing from about 5% to about 40% barium chloride is added to the ferrous hydroxycarbonate slurry. After agitation of the slurry a solution of 5–15% sodium or ammonium carbonate is added to precipitate barium carbonate on the ferrous hydroxycarbonate particles. The co-slurry is then filtered, washed, dried and subsequently converted to barium ferrite by calcination.

A further aspect of the invention involves the reaction of $FeCl_3$ of from about 5% to about 50% concentration with $BaCl_2$. The filtered solution is treated with $Na_2CO_3$ or $(NH_4)_2CO_3$ in order to precipitate the iron-barium hydroxycarbonate co-precipitate. The co-precipitated slurry is then filtered, washed and dried and calcined in a manner similar to the procedures discussed above. It has been further determined that accelerated aging by aeration of the spray drier feed results in a calcined powder of improved properties. The preferred procedure is to aerate to pH of from about 8 to 8.4.

The identification of the powder prepared by each of the three routes discussed above as being barium ferrite ($BaFe_{12}O_{19}$) was confirmed by X-ray diffraction and electron micrographs.

It shall be readily apparent to one skilled in the art that soluble ferrous, ferric or barium salts other than those specifically exemplified may be employed in the process of the invention. For example, ferrous chloride or ferrous nitrate among others may be utilized in place of the ferrous sulfate material. The choice of the particular salt shall generally be dictated by the prevailing cost of the material since the class of soluble ferric, ferrous or barium salts are functionally equivalent with respect to their respective performance in the process.

The invention will be described in greater detail with reference to the following illustrative examples.

EXAMPLE I

Ferrous sulfate solution (10% $FeSO_4 \cdot 7H_2O$) and 10% sodium carbonate solution are fed simultaneously into a baffled reactor which is vigorously agitated. The flow rate is controlled so as to obtain an excess of 20% sodium carbonate. Following a five minute retention time in the reactor the gray-green ferrous hydroxycarbonate slurry is filtered and washed with de-ionized water. The cake is then repulped with a sufficient quantity of water to produce a homogenous slurry. Analysis of this particular repulped slurry reveals that 56 lbs. of the slurry contains 1.34 kg. of Fe. 0.434 kg. of barium carbonate slurry (2.20 moles) is added slowly with vigorous agitation to the repulped material. The co-slurry that forms is aged three days with continuous agitation. The aged co-slurry is then spray dried at a product temperature of 140° C. The spray dried product is an orange to brown free-flowing powder.

EXAMPLE II

The ferrous hydroxycarbonate slurry is prepared in the manner described in Example I. To 15 gallons of the ferrous hydroxycarbonate slurry containing 1.038 kg. of iron as Fe (18.6 moles) is added a solution containing 416 g. of $BaCl_2 \cdot 2H_2O$ (1.7 moles). The resulting co-slurry is agitated for 30 minutes and is then treated with a solution containing 212 g. (2 moles) of sodium carbonate. The resulting co-slurry which consists of a precipitate of barium carbonate-ferrous hydroxycarbonate is filtered and washed with deionized water to remove sodium and chlorine ions. After repulping to a convenient viscosity which may vary from about 150 to about 2000 cps., the co-slurry is spray dried in accordance with the procedure of Example I.

EXAMPLE III

Fifteen gallons of a solution containing 21.8 moles (3.54 kg.) $FeCl_3$ is mixed with a 2 gallon solution containing 2.0 moles (0.488 kg.) $BaCl_2 \cdot 2H_2O$. The combined solutions are then filtered to remove insoluble particles. 42 moles of $Na_2CO_3$ (4453 g.) is added with agitation to completely precipitate the iron-barium hydroxycarbonate co-precipitate. The co-precipitated slurry is then filtered and washed with deionized water to remove sodium and chlorine ions. After repulping the filter cake, the homogeneous slurry is spray dried in accordance with the procedure of Example I. The product is a dark reddish-brown powder.

The spray dried products obtained in Examples I, II and III are converted to barium ferrite by calcination at a temperature of 1100° C. After calcination is complete, the powder is cooled to ambient temperatures and screened through 270 mesh to break up any agglomerates. The specific gravity of barium ferrite powders obtained in this manner ranged from 4.5 to 5.3 g./cc.

The barium ferrite powders prepared according to the present invention can be formulated into flexible magnets according to methods known to the art. The following is an example of such a formulation.

Plaskon No. 4 formulation

| | Parts |
|---|---|
| Plaskon CPE 102 | 100 |
| Paraplex G-54 | 25 |
| Paraplex G-62 stabilizer | 5 |
| Mark WSX stabilizer | 3.5 |
| Stearic acid | 2 |
| Barium ferrite to >60% by volume (about 90% by weight). | |

The barium ferrite is added to the binder on a conventional rubber mill having differentially speeded rolls. After milling to a uniform sheet, the sheet is stripped off and can be extruded or molded prior to magnetization. This same technique may be employed in incorporating the ferrite powder into well known flexible non-magnetic elastomeric matrices such as rubber and polymer materials. Conversely, the formulation can be mixed by other conventional means, and extruded.

While the principles of the invention have been described above in connection with specific embodiments, and particular modifications thereof, it is to be clearly understood that this description is made only by way of example and not as a limitation on the scope of the invention. It will be evident to those skilled in the art that many modifications and variations of this process may be carried out without departing from the spirit of the invention as defined in the following claims.

We claim:
1. A method of producing barium ferrite adapted for use in the preparation of permanent magnets which comprises reacting a ferrous sulfate solution of 5–15% con- centration and a solution of sodium or ammonium carbonate of 5–15% concentration to form a ferrous hydroxycarbonate precipitate, filtering and treating said precipitate with a solution of barium carbonate of 10–50% concentration to form barium carbonate-ferrous hydroxycarbonate which is then dried and converted to barium ferrite by calcination at temperatures from about 900–1200°C.

2. The method of claim 1 wherein an excess of sodium carbonate is employed.

3. The method of claim 2 wherein the time between precipitation and filtration of the ferrous hydroxycarbonate should not exceed about 2½ hours.

4. A method of producing barium ferrite adapted for use in the preparation of permanent magnets which comprises reacting a solution of ferrous sulfate of 5–15% concentration and a solution of sodium or ammonium carbonate of 5–15% concentration to form a ferrous hydroxycarbonate precipitate and treating said precipitate with a barium chloride solution of 5–40% concentration and a solution of sodium or ammonium carbonate of 5–15% concentration to form barium carbonate-ferrous hydroxycarbonate which is then dried and converted to barium ferrite by calcination at temperatures from about 900–1200° C.

5. The method of claim 4 wherein an excess of sodium carbonate is employed.

6. The method of claim 5 wherein the time between precipitation and filtration of the ferrous hydroxycarbonate should not exceed about 2½ hours.

References Cited

UNITED STATES PATENTS

| | | | |
|---|---|---|---|
| 3,049,404 | 8/1962 | Wade | 23—50 |
| 3,155,623 | 11/1964 | Erickson et al. | 252—62.63X |
| 3,378,335 | 4/1968 | Ellis et al. | 23—51 |

FOREIGN PATENTS

| | | | |
|---|---|---|---|
| 739,069 | 10/1955 | Great Britain | 23—51 |
| 866,420 | 4/1961 | Great Britain | 23—51 |

HERBERT T. CARTER, Primary Examiner

U.S. Cl. X.R.

148—101